March 10, 1953 J. F. RANDALL ET AL 2,631,215
WELDING SYSTEM
Filed Aug. 24, 1950 2 SHEETS—SHEET 1
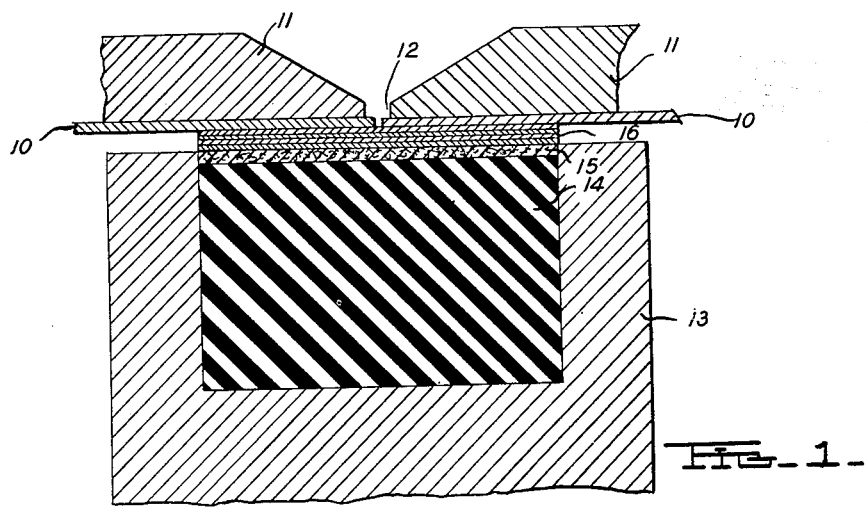
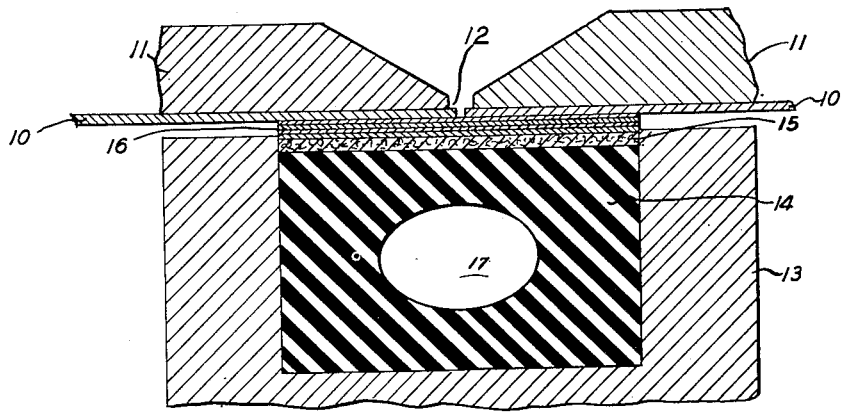
R. E. BROOKS
J. F. RANDALL
INVENTOR.
BY E. C. McRae
J. R. Faulkner
J. H. Oster
ATTORNEYS Patented Mar. 10, 1953

2,631,215

UNITED STATES PATENT OFFICE 2,631,215

WELDING SYSTEM

John F. Randall, Detroit, and Richard E. Brooks, Dearborn, Mich., assignors to Ford Motor Company, Dearborn, Mich., a corporation of Delaware Application August 24, 1950, Serial No. 181,278

1 Claim. (Cl. 219—18)

This invention is concerned with a method and apparatus for electric welding and more particularly with an improvement in the art of inert gas shielded welding of sheet metal.

For welding aluminum and magnesium and for welding thin, mild steel the use of argon or helium shielded arcs present many advantages. Conventionally the arc is maintained between a tungsten electrode and the work and a filler wire of composition similar to the work is fed to the arcs. This process is coming into extensive use in the building of motor vehicle bodies where it is desired to weld together the edges of thin, mild steel body stock and then grind the weld so that after finishing and painting the weld will not show. This is accomplished by securing the two parts to be welded together rigidly in a fixture with the edges to be joined closely adjacent each other. It is difficult to secure satisfactory welds if the space between the edges of the part to be welded exceeds one sixteenth of an inch. The portions of this fixture adjacent the arc must be fabricated of copper or other highly conductive metal to avoid accidental welding of the work to the fixture. The use of highly conductive metal in this fixture is also advantageous in that it minimizes danger of damage to the fixture from accidental contact with the welding arc and also serves to cool the parts being welded and prevent distortion.

It is essential that the parts to be welded be secured in the die by a pressure of about eight hundred pounds per lineal inch to avoid the edges of the parts being drawn together by the shrinkage of the weld metal as the weld progresses. It is also necessary that the fixture exactly accommodate the parts to be welded. Otherwise some parts of the edges are certain to be misaligned and result in poor welds. This requires that the fixtures be made with practically the same exactitude as metal forming dies. Even more important conventional "Heliarc" welding dies must be accorded continuous and careful maintenance to maintain their original precision, if defective welds are to be avoided.

In an endeavor to lower the costs of these welding fixtures and expedite their construction, the instant invention has been developed. This invention is probably best understood by a study of the figures of the drawing in which:

Figure 1 is a diagrammatic cross section of one form of welding fixture.

Figure 2 is a diagrammatic section of a variation of the structure shown in Figure 1.

Figure 3:
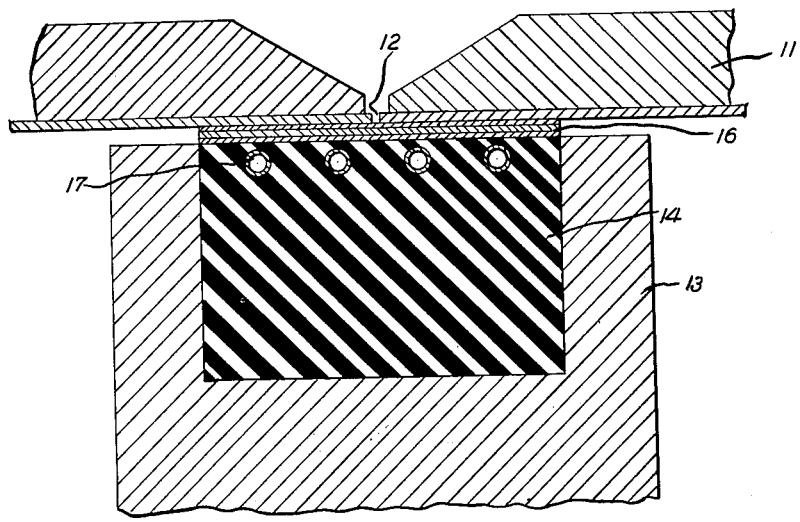
Figure 3 is a diagrammatic section of a welding apparatus with a separate cooling means.

In Figure 1 the two sheet steel parts to be welded together are designated by the numeral 10. These parts are shown directly below die 11 which is provided with groove 12 in alignment with the joint to be formed between the two parts 10. This groove 12 is provided for the accommodation of the welding torch. The two sheet metal parts 10 are positioned by die 11 and supported from below by movable member 13, elastomer block 14, asbestos sheet 15, and laminations 16.

Figure 2 is similar to Figure 1 except that elastomer block 14 is provided with a central cavity 17 for the reception of hydraulic fluid.

To make a weld the movable member 13 is retracted sufficiently to permit the insertion of sheet metal parts 10. Movable member 13 is then moved towards die 11 sufficiently to firmly clamp metal parts 10 between die 11 and laminations 16. The welding operation is now performed and movable member 13 is retracted sufficiently to permit the welded pieces to be removed from the die. The operation of the apparatus shown in Figure 2 is similar to that of Figure 1 except that the introduction of hydraulic fluid under pressure into central cavity 17 is substituted wholly or in part for movement of movable member 13.

Laminations 16 are preferably made of copper although any available metal having a high thermal conductivity may be employed.

The prime purpose of these laminations is to provide a support for the pieces to be welded which is sufficiently flexible and yielding to enable it to conform to irregularities and inaccuracies in the fixture and pieces to be welded and still exert a sufficiently intense clamping pressure. Another purpose of these laminations is to prevent the flow of heat from the weld to the elastomer. This is accomplished because the high thermal conductivity of the laminations tends to transmit the heat in a plane parallel to and not normal to the laminations and the interfaces between the laminations offer effective barriers to the flow of heat normal to the plane of the laminations. The sheet of asbestos 15 interposed between the laminations 16 and the block of elastomer 14 serves to further protect the elastomer 14 from the heat of the weld. It is not essential that this layer be asbestos. Any available rugged, flexible, heat resistant and insulating material may be used. In many instances the heat insulating layer may be dispensed with entirely if heat can be dissipated by the copper parts or by auxiliary cooling means rapidly enough to prevent thermal damage to the elastomer.

The mechanism shown in Figure 2 is designed to partially or wholly substitute hydraulic pressure for the movement of movable member 13. If the contour of the sheet metal parts 10 permits, movable part 13 may in fact be fixed and sufficient clearance for insertion and withdrawal of sheet metal parts 10 may be obtained by relaxing the hydraulic pressure in cavity 17. When the sheet metal parts 10 are in place, they may be securely clamped by the provision of adequate hydraulic pressure in cavity 17.

The apparatus shown in Figure 3 is similar to that shown in Figure 1 except that asbestos strip 15 has been omitted and coolant tubes 17 has been added to keep the temperature of elastomer block 14 within safe operating limits.

Figure 4:
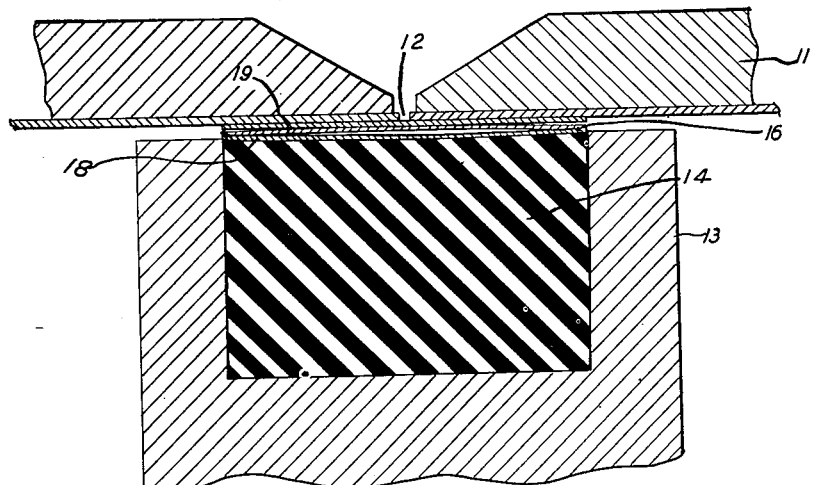
Figure 4 is a diagrammatic section of a welding apparatus with another form of cooling.

The apparatus shown in Figure 4 accomplishes the necessary heat dissipation in a somewhat more direct manner. Lamination 18 and lamination 19 are welded together at the edges to form a conduit. This conduit is connected to a source of water under pressure and when the fixture is not in use the water pressure forces apart laminations 18 and 19 as shown in Figure 4 and permits the water to flow through the conduit so formed. When the fixture is in use the pressure will flatten this conduit and force out the water.

Under some circumstances a single lamination may be employed between the work and the asbestos or a plurality may be employed. It is imperative however that the laminations be few enough in number and thin enough so that they can be deformed to accommodate differences in thickness between the two sheets of metal to be joined and still apply adequate clamping pressure to each. Similarly these laminations must be flexible enough to compensate for wear or irregularities in the die 11. Two laminations each about sixty thousandths of an inch thick have been found to give satisfactory results.

It is to be understood that if desired, the die 11 may be made movable and the opposing member fixed or both may be made movable. Similarly a coolant may be circulated through cavity 17 to dissipate any heat which may accumulate in the elastomer.

We claim as our invention:

In an apparatus for electrically welding sheet metal parts in edge to edge relationship, a pair of opposed clamping members, one of which is provided with a groove for the reception of a welding electrode, the other of said clamping members comprising a block of elastomer upon which is supported at least two laminations of highly heat conductive metal, two edges of said laminations being joined together to form a cooling conduit.

JOHN F. RANDALL.
RICHARD E. BROOKS.

REFERENCES CITED

The following references are of record in the file of this patent:

UNITED STATES PATENTS

| Number | Name | Date |
|---|---|---|
| 1,612,317 | Reed | Dec. 28, 1926 |
| 1,640,437 | Chapman | Aug. 30, 1927 |
| 1,840,737 | Peck | Jan. 12, 1932 |
| 2,176,664 | Burke | Oct. 17, 1939 |
| 2,493,950 | Dow et al. | Jan. 10, 1950 |